UNITED STATES PATENT OFFICE.

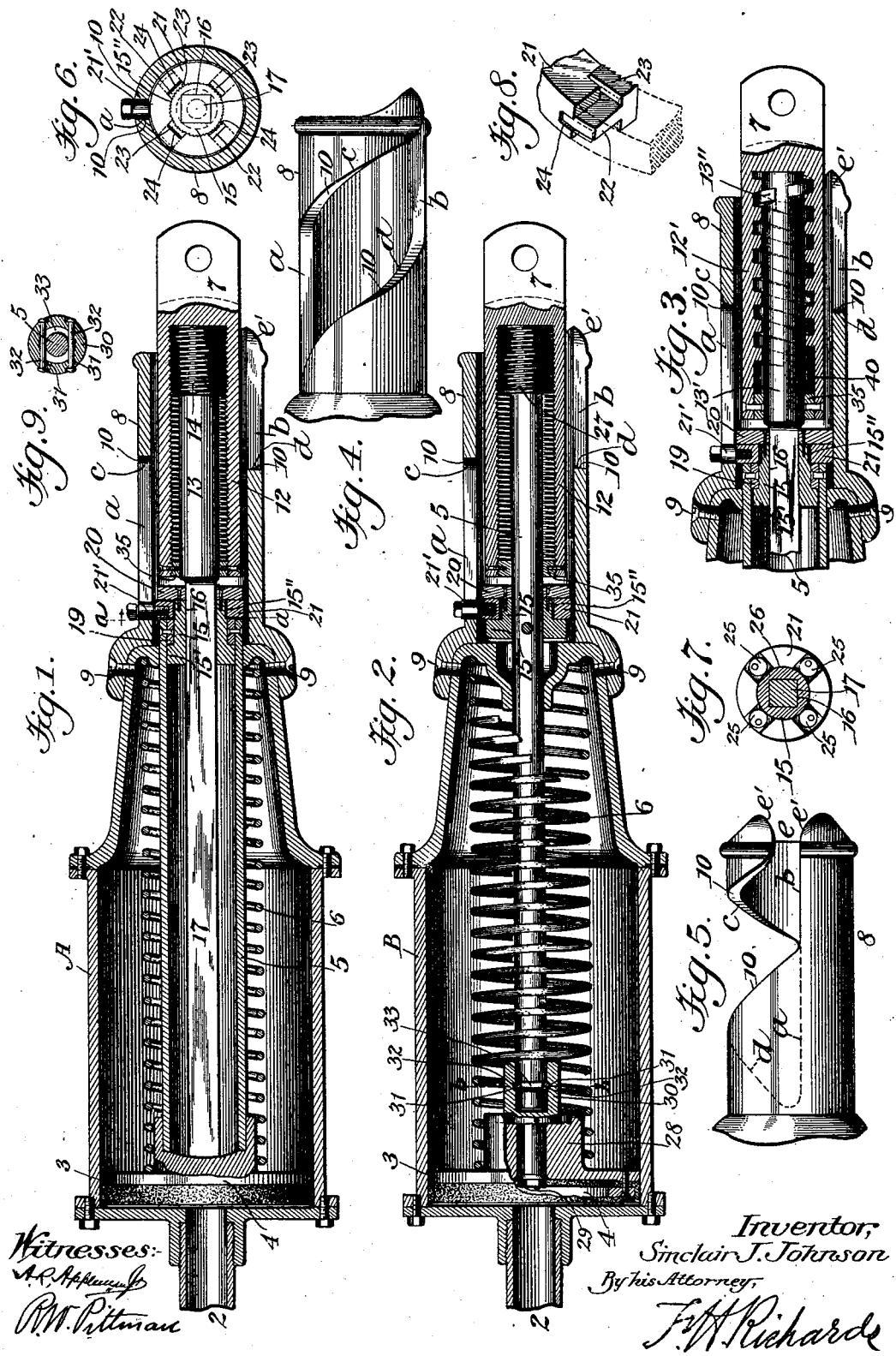

SINCLAIR J. JOHNSON, OF NUTLEY, NEW JERSEY.

AUTOMATIC SLACK-ADJUSTING MEANS FOR BRAKES.

SPECIFICATION forming part of Letters Patent No. 685,380, dated October 29, 1901.

Application filed August 29, 1900. Renewed August 1, 1901. Serial No. 70,499. (No model.)

*To all whom it may concern:*

Be it known that I, SINCLAIR J. JOHNSON, a citizen of the United States, residing in Nutley, in the county of Essex and State of New Jersey, have invented certain new and useful Improvements in Automatic Slack-Adjusting Means for Brakes, of which the following is a specification.

This invention relates to brakes, more particularly to an improved slack-adjuster therefor, the object of the invention being to provide improved automatic means for taking up the slack thereof, thereby to enable the brake-shoes to effectively act upon the wheels of the vehicle each time the brakes are set.

A further object of the invention is to provide an improved automatic slack-adjuster for brakes so constructed that it can be applied without material change to the brake mechanism ordinarily used on railway-cars, the organization being such that the number of parts forming the same are comparatively few and the assemblage and operation thereof simple.

In the drawings accompanying and forming part of this specification, Figure 1 is a longitudinal sectional view of a brake-cylinder such as that ordinarily used with the Westinghouse brake system with this improved slack-adjusting means for brakes connected therewith, the organization shown being that usually used in connection with freight-cars. Fig. 2 is a longitudinal sectional view substantially similar to that shown in Fig. 1, the organization shown being that usually used in connection with passenger-cars. Fig. 3 is a longitudinal sectional view of a somewhat-different form of the slack-adjusting means shown in Figs. 1 and 2. Figs. 4 and 5 are views of the actuator. Fig. 6 is a cross-sectional view taken in line *a a*, Fig. 1, of a device the operation of which is controlled by the actuator. Fig. 7 comprises an eccentrically-operative means which may be used in place of the device shown in Fig. 6. Fig. 8 is a detail view of the ratchet devices shown in Figs. 1, 2, 3, and 6; and Fig. 9 is a cross-sectional view taken in line *b b*, Fig. 2.

Similar characters of reference designate corresponding parts throughout the several views.

In the form shown this improved automatic slack-adjuster comprises means adjustably connected with the lever mechanism of a brake system—such, for instance, as with a cross-head thereof—and which consists of a piston member comprising, when the brake-cylinder is of that form usually used with freight-cars, a push bar or rod forming a part of or having connection with the tubular piston-rod, or comprising, when the form of brake-cylinder usually used with passenger-cars is provided, the piston-rod itself, means for adjusting this piston member, which preferably comprises a rotary device, which will for the purposes of the description and claims be designated as a "ratchet mechanism," although the same may not necessarily be provided with ratchet-teeth, and an actuator or actuating means comprising in the form shown a cam member. Since, as hereinbefore stated, this improved automatic slack-take-up means for brakes is adapted for use with the ordinary brake-cylinder as used in connection with freight or passenger cars, therefore in Fig. 1 a brake-cylinder A adapted for use with freight-cars is shown, while in Fig. 2 is illustrated a brake-cylinder B for use with passenger-cars. Each of these brake-cylinders is provided with an air-inlet 2 adjacent to the piston 3, comprising the usual piston-head 4, connected with its piston-rod 5, the return of which piston to its normal position being controlled by a spring 6, although other means may be used with some brake systems. The essential difference between the freight-car brake-cylinder and the passenger-car brake-cylinder is that in the former the piston-rod 5 is usually a tubular member passing through one end of the brake-cylinder and connected in some suitable manner, as by means of a sliding push rod or bar, with the cross-head of the lever mechanism, while in the passenger-car brake-cylinder the piston-rod is usually a solid bar or rod likewise passing through one end of the brake-cylinder and connected in some suitable manner with said cross-head.

In the form shown herein and which may be its preferred form, if desired, this improved slack-take-up means comprises an actuator 8, shown herein as a sleeve one end of which is formed to engage and preferably encircle one end of the brake-cylinder, to which it is secured in some suitable manner, as by screws or bolts 9. This actuator is provided with a cam-path, shown as a pair of oppositely-located and independently-acting surfaces 10, formed by cutting away a portion of said sleeve to form an opening, the side faces *a* and *b* of which are straight, while the end faces *c* and *d* thereof are curved in accordance with the path which the device operated by said actuator is to follow. In the form shown these curved surfaces are of substantially spiral formation. From the above it will be seen that this actuator is in the nature of a cam member or actuator. In the present instance the cross-head is provided with a tubular interiorly-threaded member 12, projecting into the actuator-sleeve 8.

In the form illustrated in Fig. 1 the cross-head is connected by means of its threads to a piston member 13, shown in this instance as a push-bar, which preferably has an enlarged threaded end 14, which through the means about to be described is rotated within the tubular portion of the cross-head member 7 to thereby shift such cross-head to take up the slack of the brake-shoes. This rod 13 extends within the hollow piston-rod 5 of the brake-cylinder, the inner end thereof being in position to be engaged by the piston-head, whereby such rod will be shifted simultaneously with the tubular piston-rod, so that to a certain extent it forms a part of the piston-rod, since it forms the connection or coupling between such piston-rod and the cross-head.

A sleeve 15, having a squared opening 16, fits on the squared portion 17 of this rod 13 and within which the rod slides. In this organization this rod is shifted with the piston-head to set the brakes; but on the return of this piston to its normal position by the action of the spring the weight of the brake-shoes returns the rod 13 to its normal position. This sleeve 15 is provided with a flanged end 15', by means of which it is held against longitudinal displacement in one direction within the hollow piston-rod 5 by a collar 19, secured on the interior of such piston-rod 5, and in the opposite direction by a centrally-bored cap 20, fastened to the end of said sleeve 15, and which cap abuts against the pawl-carrying ring hereinafter described and holds the same in proper working position. This sleeve 15 is rotatable within said piston-rod and is provided at one part thereof in one form shown with ratchet-teeth 15'', which are encircled by a ring 21, carrying in the present instance a series of gravity pawls or dogs 22, each shown comprising a member 23, sliding in a slot or recess 24 of such ring 21 and having a series of teeth. In place of these pawls the ring may be provided with one or more eccentrically-pivoted devices 25, effective to engage a smooth surface 26 of the sleeve 15, thereby to rotate such sleeve.

Carried by the ring 21 is a projection, such as a roll 21', in position to be engaged by the working faces of the actuator, and thereby rotate said ring 21. From the foregoing it will be seen that when the ring is moved in one direction the pawl ratchet-teeth will engage the teeth of the sleeve 15 and rotate the rod 13 within the piston-rod 5.

In the form shown in Fig. 2 the ratchet mechanism is substantially similar to that just described. In this instance, however, the ratchet-sleeve is bolted to the piston-rod. The piston-rod 5, however, is preferably provided with an enlarged threaded end 27, engaging the interior threads of the cross-head member 7. In this form the piston-rod is connected with the piston-head by a coupling, which will permit the rotation of such rod, while permitting longitudinal movement thereof with the piston-head, and for this purpose the piston-head is shown provided with a projection 28, to which by means of a bolt 29 is secured a tubular member or socket-piece 30, having a pair of transversely-extending openings 31, communicating with an annular groove 33 on the end of the piston-rod which extends into said socket-piece. Through these openings 31 extend the bolts 32, which engage in such annular groove 33, and while permitting the rod to rotate relatively to the piston-head rigidly connect the two together for movement longitudinally of the brake-cylinder. It will be obvious that the piston-rod could project directly into the piston-head and be coupled thereto in the manner just described or in any other desired way.

In each form shown herein the separation of the piston-rod from its cross-head is prevented by a ring 35, secured at the inner ends of the cross-head tubular member, whereby when the cross-head has been shifted as far as the threads thereof will permit the enlarged threaded end of the rod will engage this ring and prevent the separation of such parts.

In the organization shown in Fig. 3 the mechanism is substantially similar to that shown in Fig. 1, except that the end of the rod 13' is provided with a single enlarged or coarse thread 13'', while the tubular cross-head member 12' is provided with similar threads, which, however, do not extend the full length thereof, whereby a space 40 is provided to permit the rod 13' to freely rotate within such cross-head member when the cross-head has been adjusted as far as its threads will permit.

In use it will be seen that when air is admitted to the brake-cylinder the piston will be forced forward in the usual manner against the action of its spring and push forward the cross-head, thereby operating the brake-mechanism levers in the usual manner to set the brakes. This operation of course carries the roll 21' along the straight surface *a* of the actuator-sleeve 8 until it reaches the forward curved surface *c* of such sleeve, down which it will ride to the extent necessary to permit the brake-shoes to effectively engage the wheels, this being permitted by the action of the ratchet mechanism, the teeth of the pawls at this time sliding over the teeth of the sleeve 15. In order to insure the setting of the brakes should the cam-path be of insufficent length, this cam-path is shown terminating in a longitudinally-extending portion e, opening at the free end of the actuator, whereby when the roll reaches the end of the surface c it can move in the part e to the extent necessary. The walls e' of this part e are shown as curved, thereby to properly guide the rolls on the release of the brakes back into the cam-path. When the brake-shoes are released, the ratchet mechanism of course prevents the return of the roll 21' toward the straight surface a of the actuator, so that as the spring returns the piston-head and its rod to their starting position the roll 21' passes directly across from the front curved surface e to the rear curved surface d of the actuator, whereupon the action of the spring forces it along such curved surface d to its starting-point. As the roll passes along this curved surface d the pawls of the ring rotate the ratchet-sleeve, which in turn rotates the rod to turn the same within the cross-head and shift the same a distance corresponding to the length of the curved surface d, over which the spring has forced the roll, so that slack to an amount equal to the length of the curved surface d, over which the roll is forced, will be taken up each time the brakes are released. By this improved organization it will be seen that each time the brake mechanism is released the brake-shoes are adjusted if any slack is present, and since only an amount of slack equal to the length of the surface d can be taken up each time it follows that, however much slack may be present owing to undue strain or otherwise upon the brake mechanism, such mechanism will not be adjusted to such an extent that when it returns to its normal condition it will refuse to properly work. Furthermore, it will be seen that in the organizations shown the ratchet mechanism will be actuated each time the brake mechanism is released if any slack is to be taken up. In Fig. 1 this ratchet mechanism is connected directly to the tubular piston-rod, which is actuated or returned to its normal position by its spring 6, so that whether the push-bar is returned to its normal position or not by the gravity of the brake-shoes slack will nevertheless be taken up, since this push-bar will in each instance be rotated during the return of the tubular piston-rod. Moreover, by providing the cam with independently-acting faces c and d slack is not taken up until after the mechanism is fully released from tension due to the thrust of the piston-rod and the spring of the lever system, since the shifting of the cross-head is not effected until the roll has moved entirely across the space between the faces c and d and engaged the latter face d, at which time the brake-shoes and brake system are completely released, so that the taking up of slack is very much facilitated, while undue strain on the ratchet mechanism is avoided.

If, however, the roll of the ratchet mechanism returned over the face c, which would be the case if such faces c and d were located in position so as to both engage the roll simultaneously, the taking up of slack would necessarily take place before the brake-shoes and brake mechanism were completely released, and consequently while such brake-shoes were set, so that a part of this adjustment would necessarily take place during a portion of the time that such brake-shoes and brake mechanism were set.

In the claims the term "ratchet mechanism" is intended to include the eccentrically-formed operating devices herein shown and described.

I claim as my invention—

1. In a slack-adjuster, the combination, with a cross-head having an interiorly-threaded tubular part, of a piston member having a threaded part projecting into said tubular part; and means for rotating said piston member relatively to such cross-head thereby to take up slack of the mechanism.

2. In a slack-adjuster, the combination, with a cross-head having an interiorly-threaded tubular part, of a piston member comprising a piston-rod rotatable independently of the piston-head and having a threaded part projecting into said tubular part; and means for rotating said piston member relatively to such cross-head thereby to take up slack of the mechanism.

3. In a slack-adjuster, the combination, with a cross-head having an interiorly-threaded tubular part, of a piston member having a threaded part projecting into said tubular part; and means for rotating said piston member relatively to such cross-head thereby to take up slack of the mechanism, said means comprising an actuator having a cam-path, and means in operative connection with said piston member and shifted by said actuator.

4. In a slack-adjuster, the combination, with a cross-head having an interiorly-threaded tubular part, of a piston member having a threaded part projecting into said tubular part; and means for rotating said piston member relatively to such cross-head thereby to take up slack of the mechanism, said means comprising an actuator having a cam-path, and ratchet mechanism in operative connection with said piston member and shifted by said actuator.

5. An automatic slack-adjuster for brake mechanism comprising, in combination with a brake-cylinder, a piston member rotatably connected with the cross-head of the lever mechanism; a cam-sleeve rigidly secured to said brake-cylinder and having cam-surfaces; ratchet mechanism carried by said piston member and having a roll shifted by said cam-surfaces and effective to rotate said piston member relatively to said cross-head thereby to shift the latter to take up slack.

6. An automatic slack-adjuster for brakes comprising, in combination with a brake-cylinder, a device connected with the lever mechanism of the brake system and having an interiorly-threaded tubular sleeve; a spring-actuated piston member shiftable in said brake-cylinder and having a threaded end working in said threaded sleeve; an actuator having a cam-path; a rotatable sleeve rigidly secured to said piston member; and means actuated by said actuator for rotating said sleeve and thereby the piston member to shift said lever-connected device.

7. An automatic slack-adjuster for brakes comprising, in combination with a brake-cylinder having a spring-actuated piston therein, a device connected with the lever mechanism of the brake system and having an interiorly-threaded tubular sleeve; a piston member connected with said piston and having a threaded end working in said threaded sleeve; an actuator having independently-acting cam-surfaces; a rotatable sleeve rigidly secured to said piston member; and ratchet mechanism operated by one of the cam-surfaces of said actuator for rotating said sleeve and thereby the piston member to shift the lever-connected device and take up slack.

8. In a slack-adjuster, the combination, with a piston member and with a member connected therewith, and adapted to be adjusted longitudinally relatively thereto, of means for effecting such adjustment, and comprising an actuator having independently-acting cam-surfaces, one effective at one period and another at a different period; and means controlled thereby for shifting said member.

9. In a slack-adjuster, the combination, with a piston member and with a member connected therewith, and adapted to be adjusted longitudinally relatively thereto, of means for effecting such adjustment, and comprising an actuator having oppositely-located independently-acting cam-surfaces, one effective at one period and another at a different period; and means controlled thereby for shifting said member.

10. In a slack-adjuster, the combination, with a piston member, and with a member connected therewith, and adapted to be adjusted longitudinally relatively thereto, of means for effecting such adjustment, and comprising an actuator having independently-acting cam-surfaces, one effective at one period and another at a different period; a device connected to one of said members and having a working surface; and means in operative engagement with said working surface and provided with a projection shifted by said cam-surfaces at different periods to effect such adjustment and take up slack.

11. In combination, with a brake-cylinder, a piston member provided with a threaded surface; a member connected with the lever mechanism of the brake system and having a threaded surface coöperating with the threaded surface of said piston member whereby said piston member is rotatable relatively to said lever-connected member to shift the latter, and means operative to rotate said piston member at a predetermined period thereby to shift said lever-connected member to take up slack, said means comprising an actuator having a pair of independently-acting cam-surfaces; a sleeve rigidly connected with said piston member; and means actuated by one of said cam-surfaces for rotating said sleeve and thereby the piston member.

12. In combination, with a piston member of a brake system and with a member connected with the lever mechanism of said brake system, such members having rotatable connection, means for rotating one of said members relatively to the other thereby to shift the other member and take up slack, said means comprising an actuator having a pair of independently-acting cam-surfaces, and means actuated thereby and in operative connection with the rotatable member.

13. In combination, with a brake-cylinder having a piston-head located therein, a piston-rod rotatably connected with said piston-head and having a threaded surface; a member connected with the lever mechanism of the brake system and also having a threaded surface coöperating with the threaded surface of said piston-rod; and means for rotating said piston-rod thereby to shift the lever-connected member and take up slack.

14. In combination, with a brake-cylinder having a piston-head located therein, a piston-rod rotatably connected with said piston-head and having a threaded surface; a member connected with the lever mechanism of the brake system and also having a threaded surface coöperating with the threaded surface of said piston-rod; and means for rotating said piston-rod thereby to shift the lever-connected member and take up slack, said means comprising an actuator having a cam-surface; a device rigid with said piston-rod; and means shifted by said cam-surface for rotating said device and thereby the piston-rod.

15. In combination, with a brake-cylinder having a piston-head located therein, a piston-rod rotatably connected with said piston-head and having a threaded surface; a member connected with the lever mechanism of the brake system and also having a threaded surface coöperating with the threaded surface of said piston-rod; means for rotating said piston-rod thereby to shift the lever-connected member and take up slack, said means comprising a sleeve rigidly connected to said brake-cylinder and having a pair of cam-surfaces; a sleeve rigidly connected to said piston-rod and having a ratchet-surface; a pawl in engagement with said ratchet-surface; and a projection shifted by said cam-surface for actuating said pawl.

16. In combination, with a piston member of a brake mechanism, a member connected with the lever mechanism of said brake mechanism, one of said members having a plurality of threads and the other of said members having one or more threads, and one of said members being rotatable relatively to the other, said member having the plurality of threads also having a space whereby the rotatable member may be rotated at a predetermined period without shifting the other of said members; and means for rotating said rotatable member thereby to take up slack of the brake mechanism.

17. In combination, with a piston member of a brake mechanism, a member connected with the lever mechanism of said brake mechanism, one of said members having a plurality of threads and the other of said members having one or more threads, and one of said members being rotatable relatively to the other, said member having the plurality of threads also having a space whereby the rotatable member may be rotated at a predetermined period without shifting the other of said members, and means for rotating said rotatable member thereby to take up slack of the brake mechanism, said means comprising an actuator having a cam-surface, and ratchet mechanism operated by said cam-surface to rotate said rotatable member.

18. In combination, with a spring-actuated rotatable piston member of a brake mechanism, said member having one or more threads, a member connected with the lever mechanism of the brake mechanism and having an internally-threaded sleeve with a space at one part thereof whereby the piston member is free to rotate at a predetermined period without shifting said internally-threaded member, and means for rotating said piston member thereby to shift said internally-threaded member to take up slack of the brake mechanism.

19. In a slack-adjuster, the combination, with a piston member, and with a member connected with the lever system, such members having a rotatable connection, of a cam-sleeve rigidily secured in position and having a cam-surface; mechanism having a device shifted by said cam-surface and effective to rotate said piston member relatively to said lever-connected member thereby to take up slack.

20. In a slack-adjuster, the combination, with a spring-actuated tubular piston-rod, of a piston member longitudinally shiftable therein; lever mechanism adjustably connected to said piston member; means secured to, and movable with, said tubular piston-rod and effective to rotate said piston member thereby to adjust the lever mechanism during the return of said piston-rod under the action of its spring to its normal position; and an actuator for said means.

21. In a slack-adjuster, the combination, with a spring-actuated tubular piston-rod, of a piston member longitudinally shiftable therein; lever mechanism adjustably connected to said piston member; ratchet mechanism secured to, and movable with, said tubular piston-rod and effective to rotate said piston member thereby to adjust the lever mechanism during the return of said piston-rod under the action of its spring to its normal position; and an actuator for said ratchet mechanism.

22. In a slack-adjuster, the combination, with a spring-actuated tubular piston-rod, of a piston member longitudinally shiftable therein; lever mechanism adjustably connected to said piston member; ratchet mechanism secured to, and movable with, said tubular piston-rod and effective to rotate said piston member thereby to adjust the lever mechanism during the return of said piston-rod under the action of its spring to its normal position; and an actuator having a cam-surface for said ratchet mechanism.

23. In a slack-adjuster, the combination, with a spring-actuated tubular piston-rod, of ratchet mechanism secured to and movable therewith; a piston member rotatable with said ratchet mechanism and having a sliding adjustment relatively thereto; a member rotatively connected with said piston member and having connection with lever mechanism; and an actuator for operating said ratchet mechanism, whereby during the return of such tubular piston-rod to its normal position under the action of its spring, such piston member will be rotated thereby to take up slack.

24. In an automatic slack-adjuster for brake mechanism, the combination, with a brake-cylinder, of piston mechanism; means connected, through the instrumentality of a rotary member with said piston mechanism for independent movement and with the lever mechanism of said brake mechanism; an actuator-sleeve secured to said brake-cylinder and having a transversely-extending cam-path terminating in a longitudinally-extending portion opening at the free end of said sleeve; a device shiftable in said path and effective, through the instrumentality of ratchet mechanism to rotate said rotatable member on the release of the brake to thereby shift said lever-connected means and take up slack.

SINCLAIR J. JOHNSON.

Witnesses:
FRED. J. DOLE,
C. E. VOSS.